United States Patent
Motohashi

(10) Patent No.: US 7,346,329 B2
(45) Date of Patent: Mar. 18, 2008

(54) COMMUNICATION SYSTEM, COMMUNICATION APPARATUS, AND CONTROL METHOD

(75) Inventor: Nobuo Motohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 11/064,691

(22) Filed: Feb. 24, 2005

(65) Prior Publication Data
US 2005/0250456 A1    Nov. 10, 2005

(30) Foreign Application Priority Data
Feb. 25, 2004    (JP)    ............................. 2004-050149

(51) Int. Cl.
    *H04B 1/16*    (2006.01)
(52) U.S. Cl. ................. 455/343.2; 455/574; 455/343.6
(58) Field of Classification Search .................. 455/69, 455/67.11, 423, 572, 573, 574, 575.9, 127.5, 455/343.1–6; 370/311
    See application file for complete search history.

(56) References Cited

U.S. PATENT DOCUMENTS 6,154,663 A * 11/2000 Itamochi .................. 455/569.2
6,748,228 B1 * 6/2004 Izaki et al. ................. 455/462

* cited by examiner

*Primary Examiner*—Edward F. Urban
*Assistant Examiner*—Christian A. Hannon
(74) *Attorney, Agent, or Firm*—Frommer Lawrence & Haug LLP; William S. Frommer

(57) ABSTRACT

There is provided a communication system, communication apparatus, and control method. A first communication terminal includes message transmission means for transmitting a first or second message to a second communication terminal in response to an on/off operation for a power supply. The second communication terminal includes: first power supply control means for turning off a main power supply at reception of the first message; second power supply control means for turning on the main power supply at reception of the second message; mode setting means for setting communication means to a receive-only mode at reception of the first message, or setting the communication means to a mode capable of transmitting and receiving at reception of the second message; and sub-power supply providing means for providing a sub power supply for driving the second power supply control means during power-off of the main power supply of the second communication terminal.

12 Claims, 7 Drawing Sheets

COMMUNICATION SYSTEM, COMMUNICATION APPARATUS, AND CONTROL METHOD

CROSS REFERENCES TO RELATED APPLICATIONS

The present invention claims priority to its priority document No. 2004-050149 filed in the Japanese Patent Office on Feb. 25, 2004, the entire contents of which being incorporated by reference herein.

BACKGROUND OF THE INVENTION

1. Field of the Invention

The present invention relates to a communication system, communication apparatus and control method thereof, appropriate for application in, for example, a wireless television system.

2. Description of Related Art

In recent years, a new type of television system where a base station provided with a television broadcast tuner function and an internet connection function and a monitor provided with a liquid crystal panel and speaker are provided separately has come into being (for example, refer to non-patent document 1).

With this kind of television system (in the following, this is referred to as a wireless television system), a base station and a monitor are connected together by a wireless LAN (Local Area Network) conforming to, for example, IEEE (Institute of Electrical and Electronics Engineers) 802.11 standard. The received audio-visual data of television broadcasts and homepage image data etc. downloaded from the Internet etc. in the base station are transmitted in a wireless manner to the monitor. It is then possible to enjoy television broadcasts etc. all around the house no matter where a user is by displaying images and outputting audio at a monitor based on this audio-visual data and image data.

[Non-Patent Document 1]

Airboard, (online), Sony Corporation, Nov. 25, 2003, Internet URL: http://www.sony.jp/products/consumer/airboard In this wireless television system, a base station and monitor are respectively provided with power supply switches so that the base station and monitor may be turned on and off independently through operation of these power supply switches.

However, with this wireless television system, turning on and off of the base station is completely independent and control of a power supply of the base station from a remote location is not possible. It is therefore necessary for a user to actually go to the base station every time and turn off a power supply switch in order to put the base station into a complete low power consumption state (hereinafter referred to as standby mode). This may make the wireless television system less convenient.

A system capable of turning the power supply of the base station off as a result of remotely operating the monitor as a remote controller by utilizing, for example, a communication function of the wireless television system has been considered as one method for resolving this issue.

However, in this method, a communication between the base station and the monitor is cut if a power supply of a base station is turned off. There is an issue where a power supply of a base station cannot be turned on even if a power supply of a base station can be turned off using a monitor.

In this event a configuration is adopted for a system where, for example, just a communication function is made to continue to function if the power supply of the base station is turned off, and the power supply of a base station is turned on if a message instructing to turn the power supply on is received in response to a user operation.

With this kind of wireless television system, as described above, a connection that is made between a base station and a monitor is wireless via a wireless LAN conforming to the IEEE 802.11 standard. If a communication function of a base station functioning as an access point of the IEEE 802.11 standard is made to remain functioning, electromagnetic radiation referred to as a beacon containing identification information (SSID (Service Set Identification)) and information relating to encryption at the time of communication is periodically transmitted from the base station over it's own wireless LAN.

In other words, information may be intercepted by a malevolent third party so that information relating to SSID and encryption for the base station and monitor may be misappropriated. This may enable communication between the base station and the monitor to be intercepted thereafter and means that there is a danger of illegal accesses to the Internet via the base station. Accordingly, it may not be possible to maintain a highly secure environment.

In order to take into consideration the aforementioned points, it is advantageous for the present invention to provide a communication system, communication apparatus and control method capable of improving convenience for a user while maintaining a highly secure environment.

SUMMARY OF THE INVENTION

In order to resolve the aforementioned problems, in an embodiment of the present invention, at a communication system, message transmission means for transmitting a predetermined first or second message to a second communication terminal in conjunction with an off operation or on operation of a switch for turning a power supply of a first communication terminal off or on are provided at the first communication terminal, and first power supply control means for causing a main power supply of the second communication terminal to go off if the first message is received, second power supply control means for causing a main power supply of the second communication terminal to go on if the second message is received, mode setting means for setting communication means to a receive-only mode if a first message is received and setting the communication means to a mode capable of transmitting and receiving if the second message is received, and sub-power supply providing means for providing a sub-power supply as a driving power supply for the second power supply control means during a period where the main power supply of the second communication terminal is off are provided at the second communication terminal.

As a result, in this communication system, it is also possible for the main power supply of the second communication terminal to be made to go on and off in conjunction with the power supply of the first communication terminal being made to go on and off. In this event, if the main power supply of the second communication terminal goes off, the communication means enters a receive-only mode. There is therefore no possibility, for example, of secret transmission information transmitted from the second terminal during normal operation being misappropriated by a third party during this time.

In another embodiment of the present invention, there is provided a communication apparatus including first power supply control means for causing an own main power supply to go off in conjunction with a power supply of another communication terminal going off if a first message sent from the another communication terminal is received, second power supply control means for causing an own main power supply to go on in conjunction with an operation of a power supply of another communication terminal if a second message sent from the another communication terminal is received, mode setting means for setting communication means to a receive-only mode if the first message is received and setting the communication means to a mode capable of transmitting and receiving if the second message is received, and sub-power supply providing means for providing a sub-power supply as a driving power supply for the second power supply control means during a period where an own main power supply is off.

As a result, in this communication apparatus, it is also possible for the own main power supply to be made to go on and off in conjunction with the power supply of the another communication terminal being made to go on and off. In this event, if the own main power supply goes off, the communication means enters a receive-only mode. There is therefore no possibility, for example, of secret transmission information transmitted from an own device during normal operation being misappropriated by a third party during this time.

In another embodiment of the present invention, there is provided a control method for a communication apparatus including: a step of having an own main power supply put off by first power supply control means in conjunction with an off operation of a power supply for another communication terminal if a first message sent from the another communication terminal is received and having an own main power supply put on by the second power supply control means in conjunction with an on operation of the another communication terminal if a second message sent from the another communication terminal is received, with a sub-power supply being provided as a driving power supply for the second power supply control means during a period where the own main power supply is off. Here, a mode for communicating with the another communication terminal is set to a receive-only mode if the first message is received, and is set to a mode capable of transmitting and receiving if the second message is received.

As a result, according to this control method for a communication apparatus, it is also possible for the main power supply of a communication apparatus to be made to go on and off in conjunction with the power supply of another communication terminal being made to go on and off. In this event, if the main power supply of the communication apparatus goes off, the communication means enters a receive-only mode. There is therefore no possibility, for example, of secret transmission information transmitted from the communication apparatus terminal during normal operation being misappropriated by a third party during this time.

According to the embodiments of the present invention, in this communication system, by providing message transmission means for transmitting a predetermined first or second message to a second communication terminal in conjunction with an off operation or on operation of a switch for turning a power supply of a first communication terminal off or on at the first communication terminal, and first power supply control means for causing a main power supply of the second communication terminal to go off if the first message is received, second power supply control means for causing a main power supply of the second communication terminal to go on if the second message is received, mode setting means for setting communication means to a receive-only mode if a first message is received and setting the communication means to a mode capable of transmitting and receiving if the second message is received, and sub-power supply providing means for providing a sub-power supply as a driving power supply for the second power supply control means during a period where the main power supply of the second communication terminal is off at the second communication terminal, it is also possible for the main power supply of the second communication terminal to be made to go on and off in conjunction with the power supply of the first communication terminal being made to go on and off. In this event, if the main power supply of the second communication terminal goes off, the communication means enters a receive-only mode. It is therefore possible, for example, to prevent secret transmission information transmitted from the second communication terminal during normal operation from being misappropriated by a third party during this time. This enables implementation of a communication system that dramatically improves convenience for a user while maintaining a highly secure environment.

Further, according to the embodiments of the present invention, a communication apparatus includes first power supply control means for causing an own main power supply to go off if a first message, which is sent from the another communication terminal in conjunction with an off operation for a power supply of the another communication terminal, is received, second power supply control means for causing an own main power supply to go on if a second message, which is sent from the another communication terminal in conjunction with an on operation for a power supply of the another communication terminal, is received, mode setting means for setting communication means to a receive-only mode if the first message is received and setting the communication means to a mode capable of transmitting and receiving if the second message is received, and sub-power supply providing means for providing a sub-power supply as a driving power supply for the second power supply control means during a period where the own main power supply is off, which allows the own main power supply to be made to go on and off in conjunction with the power supply of the another communication terminal being made to go on and off. In this event, if the own main power supply goes off, the communication means enters a receive-only mode. It is therefore possible to prevent, for example, secret transmission information transmitted from an own device during normal operation from being misappropriated by a third party during this time. This enables implementation of a communication apparatus that dramatically improves convenience for a user while maintaining a highly secure environment.

According to the embodiments of the present invention, a control method for a communication apparatus is provided with a step of having an own main power supply put off by first power supply control means if a first message, which is sent from the another communication terminal in conjunction with an off operation of a power supply for another communication terminal, is received and having an own main power supply put on by the second power supply control means if a second message, which is sent from the another communication terminal in conjunction with an on operation of the another communication terminal, is received, with a sub-power supply being supplied as a driving power supply for the second power supply control means being supplied during a period where the own main power supply is off. Here, a mode for communicating with another communication terminal is set to a receive-only mode if the first message is received, and is set to a mode capable of transmitting and receiving if the second message is received. It is therefore possible for the main power supply of the communication apparatus to be made to go on and off in conjunction with the power supply of another communication terminal being made to go on and off. In this event, if the main power supply of the communication apparatus is off, the communication means enters a receive-only mode. It is therefore possible to effectively prevent, for example, secret transmission information transmitted from an own device during normal operation from being misappropriated by a third party during this time. This enables implementation of a control method for a communication apparatus that dramatically improves convenience for a user while maintaining a highly secure environment.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which.

DESCRIPTION OF THE EMBODIMENT

The following is a description, with reference to the drawings, of an embodiment of the present invention.

Figure 1:
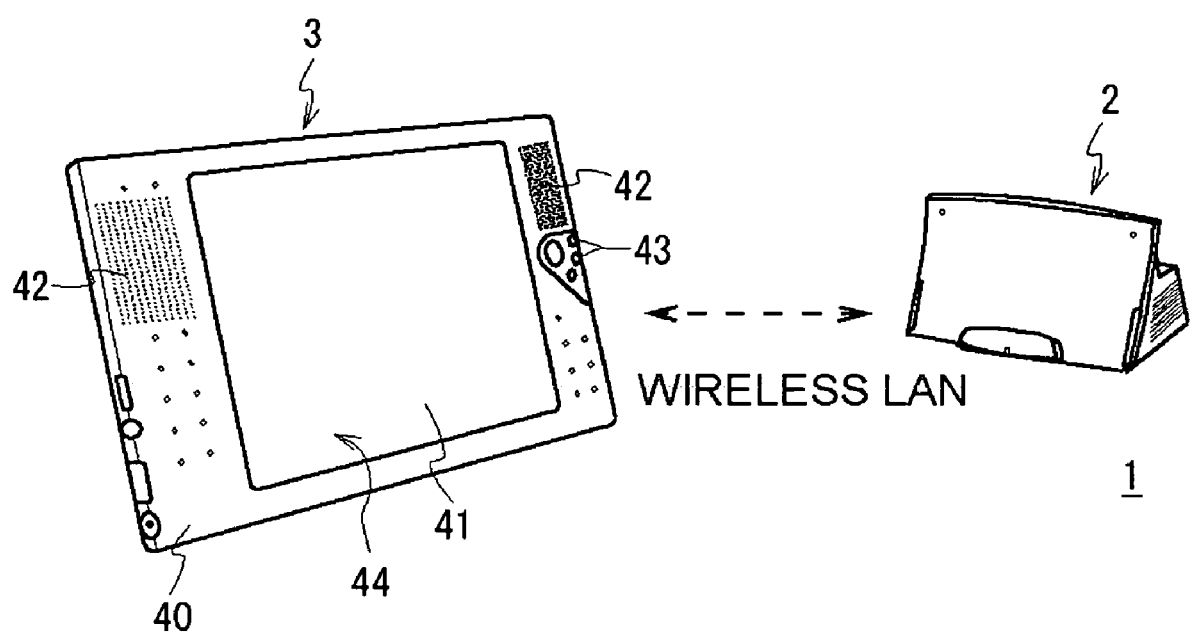
FIG. 1 is a diagram showing a composition of a wireless television system according to an embodiment of the present invention.

(1) Structural View of a Wireless Television System of an Embodiment of the Present Invention In FIG. 1, numeral 1 shows the whole of a wireless television system of an embodiment of the present invention, including a stationary base station 2 functioning as an IEEE 802.11 standard access point, and a portable monitor 3 functioning as an IEEE 802.11 standard client.

Various terminals such as an external antenna terminal 12 (FIG. 2), an audio visual input/output terminal 13 (FIG. 2), and an external network terminal 14 (FIG. 2) are provided on the rear surface at the base station 2 so as to enable connection of an external antenna 15 (FIG. 2), external AV (Audio/Video) equipment and an external network via these various terminals.

Figure 2:
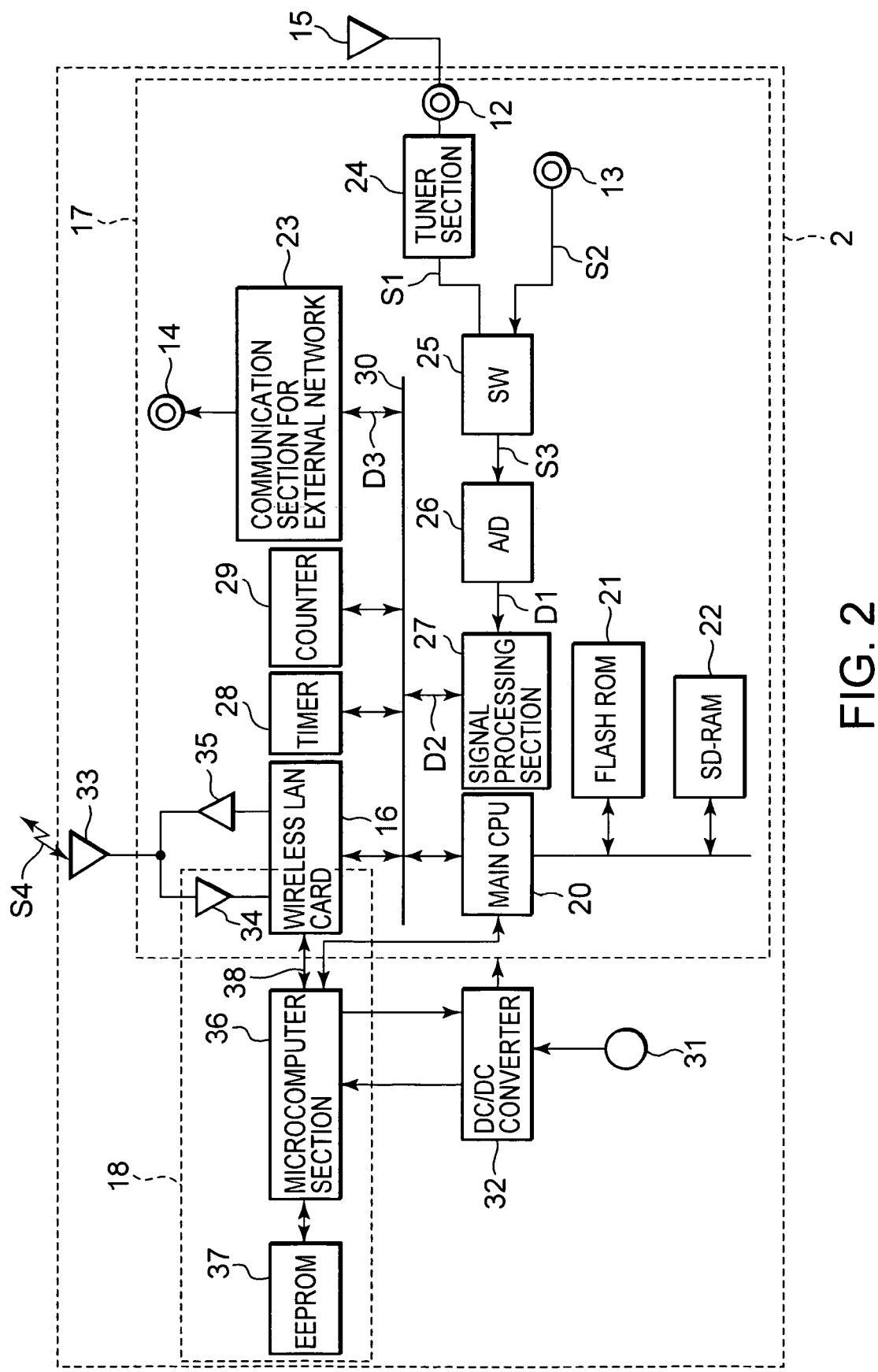
FIG. 2 is a block diagram showing a configuration of a base station section.

On the other hand, as shown in FIG. 2, a substrate formed with various circuitry and a wireless LAN card 16 conforming to the IEEE 802.11 standard are housed within the base station 2.

In this event, the various circuitry and wireless LAN card 16 are such that a supply path of a power supply is divided up between a high-current block 17 requiring a high drive current during operation, and a low-current block 18 capable of driving under low drive currents. During normal operating mode, the power supply supplies power to a high-current block 17 and a low current block 18. During standby mode, the power supply only supplies the low current block 18. In the following, the power supply for the high-current block 17 is referred to as a main power supply and the power supply for the low-current block 18 is referred to as a sub-power supply.

As is clear from FIG. 2, the high-current block 17 includes a main CPU (Central Processing Unit) 20, a flash ROM (Read Only Memory) 21 in which various control programs etc. are stored and an SD-RAM (Synchronous Dynamic-Random Access Memory) 22 taken as a work memory for the main CPU 20, an external network communication section 23 including an external network communication circuit, a tuner section 24 including a television broadcast tuner section 24, a switch 25, an analog/digital converter 26, a signal processing section 27 including MPEG (Moving Picture Experts Group) encoder etc., a timer 28, a counter 29 and the wireless LAN 16. The main CPU 20, the external network communication section 23, signal processing section 27, timer 28, counter 29 and wireless LAN card 16 are connected together via a PCI (Peripheral Component Interconnect) bus 30.

The main CPU 20 operates based on main power current supplied by a DC/DC (Direct Current/Direct Current) converter 32 if the power supply switch 31 is turned on so as to turn on the main power supply. If the main CPU 20 is first started up, communication firmware (hereinafter referred to as normal operating mode firmware) conforming to the IEEE 802.11 standard stored in the flash ROM 21 is downloaded to the wireless LAN card 16.

The wireless LAN card 16 realizes a wireless LAN conforming to the IEEE 802.11 standard communicating between the base station 2 and the monitor 3 based on this normal operating mode firmware, so as to enable information to be transmitted to and from the monitor 3 via the wireless LAN.

The wireless LAN card 16 receives various messages sent from, for example, the monitor 3 via a built-in antenna 33 and low-noise amplifier 34, then transmits these messages to the main CPU 20 via the PCI bus 30.

At this time, the main CPU 20 loads a control program stored in the flash ROM 21 in the SD-RAM 22. If various messages etc. from the monitor 3 are supplied from the wireless LAN card 16, various control processing is executed based on these messages etc. and the control program loaded in the SD-RAM 22.

For example, in the event that a message is provided indicating selection of a certain channel of a television broadcast designated by a user from the monitor 3, the main CPU 20 controls the tuner section 24 and AV switch 25 within the high-current block 17 accordingly.

At this time, the tuner section 24 receives television broadcast waves, of the television broadcast waves for each channel inputted via the external antenna 15, for the designated channel, and sends an audio-visual signal S1 for the obtained analog waveform to an AV switch circuit 25.

The AV switch circuit 25 then selects the former of the audio-visual signal S1 sent from the tuner section 24 and an audio-visual signal S2 sent from an external AV equipment via the external input terminal 13, and sends the signal S1 to the digital/analog converter circuit 26 as a selected audio-visual signal S3.

The analog/digital converter circuit 26 converts the supplied selected audio-visual signal S3 into digital from analog, and sends obtained audio-visual data D1 to the signal processing section 27. The signal processing section 27 subjects the provided audio-visual data D1 to, for example, MPEG format compression encoding processing, and sends obtained encoded audio-visual data D2 to the wireless LAN card 16 via the PCI bus 30.

This encoded audio-visual data D2 is packetized and converted to a transmission signal S4 of a predetermined format in accordance with the IEEE 802.11 standard before being transmitted to the monitor 3 via a power amplifier 35 and the built-in antenna 33.

On the other hand, if a message is obtained from the monitor 3, which instructs the transmission of the audio-visual signal S2 from an external AV equipment via, for example, the external input terminal 13, the main CPU 20 controls the AV switch 25 in accordance with the message.

At this time, the AV switch circuit 25 then selects the latter of the audio-visual signal S1 sent from the tuner section 24 and the audio-visual signal S2 sent from the external AV equipment via the external input terminal 13, and outputs the signal S2 to the digital/analog converter circuit 26 as a selected audio-visual signal S3.

This selected audio-visual signal S3 is then converted into digital from analog at the digital/analog converter circuit 26. The obtained audio-visual data D1 is then converted to the encoded audio-visual data D2 as a result of encoding processing conforming to the MPEG standard at the signal processing section 27, and is provided to the wireless LAN card 16 via the PCI bus 30. Further, the encoded audio-visual data D2 is converted to a transmission signal S4 conforming to the IEEE 802.11 standard by the wireless LAN card 16 and is then sent to the monitor 3 via the power amplifier 35 and the built-in antenna 33.

On the other hand, for example, in the event that a message is provided indicating an intention to access a URL (Uniform Resource Locator) on the Internet from the monitor 3, the CPU 20 controls the external network communication section 23 within the high-current block 17 according to this message.

At this time, the external network communication section 23 accesses a URL designated on the Internet via an external network such as, for example, an Ethernet (registered trademark). The obtained image data D3 for a correspondingly homepage is then sent to the wireless LAN card 16 via the PCI bus 30. Further, the wireless LAN card 16 converts the supplied image data D3 to a transmission signal S4 conforming to the IEEE 802.11 standard for transmission to the monitor 3 via the power amplifier 35 and the built-in antenna 33.

In this way, at the high-current block 17, during normal operating mode, designated audio-visual signals S1 and S2 and image data D3 downloaded from a designated URL may be sent to the monitor 3 based on various messages provided from the monitor 3.

With regards to this, the low-current block 18 includes the low-noise amplifier 34, the wireless LAN card 16, a microcomputer section 36 and an EEPROM (Electronically Erasable Programmable ROM) 37, and operates based on a sub-power current (sub-power supply) provided by a DC/DC converter 32 at the time of normal operation mode and standby mode.

In this case, in standby mode, firmware (hereinafter referred to as standby mode firmware) to be used at the time of standby mode read from the flash ROM 21 by the main CPU 20 is downloaded to the wireless LAN card 16. Then the communication mode of the wireless LAN card 16 is put into a receive-only mode based on the standby mode firmware at the time of standby mode.

Further, the microcomputer section 36 starts or stops supply of main power current to the high-current block 17 from the DC/DC converter 32 by controlling the DC/DC converter 32 according to instructions provided from the main CPU 20 at the time of normal operating mode and requests from the monitor 3, which is recognized via the wireless LAN card 16, at the time of standby mode. Specific processing content of the wireless LAN card 16 and the microcomputer section 36 is described in the following.

With regards to this, as is clear from FIG. 1, the monitor 3 has a board-like shape as a wholl, with a liquid crystal panel 41 and a speaker 42 arranged at the front surface of a case 40, wherein various operation switches 43 are arranged at predetermined positions at the front surface and upper surface of the case 40.

Further, a transparent touch panel 44 is arranged so as to be attached to the liquid crystal panel 41 at the front side of the liquid crystal panel 41. It is then possible for the user to input desired instructions etc. in conjunction with pressed positions to the monitor 3 by pressing corresponding positions on the touch panel 44 while visually confirming various icons and GUI screens displayed at the display panel 41.

Figure 3:
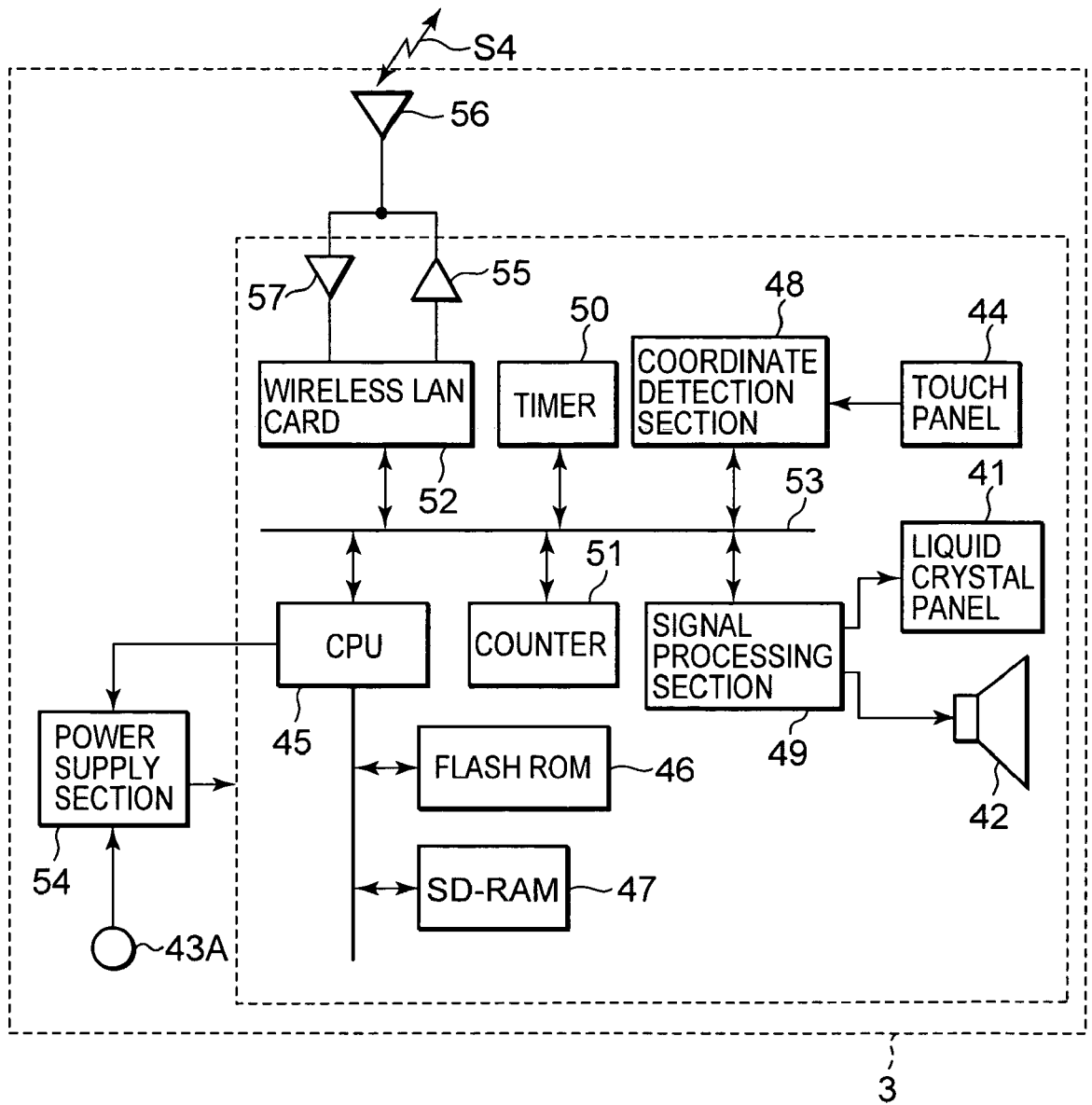
FIG. 3 is a block diagram showing a configuration of a monitor section.

As shown in FIG. 3, a CPU 45, flash ROM 46 in which various control programs etc. are stored, an SD-RAM 47 taken as a work memory for the CPU 45, a coordinate detector 48 for detecting a coordinate position of a user pressing the touch panel 44, a signal processing section 49 including an MPEG decoder etc., a substrate formed with various circuitry such as a timer 50 and counter 51, and a wireless LAN card 52 conforming to the IEEE 802.11 standard are housed within the monitor 3. Of these, the CPU 45, coordinate detector 48, signal processing section 49, timer 50, counter 51 and wireless LAN card 52 are connected together via a PCI bus 53. At the monitor 3, it is possible to supply power from a power supply unit 54 to each circuit by turning a power supply switch 43A on, so as to start up the entire monitor 3 as a result.

At the time of start-up as a result of turning on the power supply, the CPU 45 reads out a control program stored in the flash ROM 46 and loads this program in the SD-RAM 47. After this, various control processes are executed based on the control program and pressing operations of each of the various operating switches 43 and positions of pressing operations of a user on the touch panel 44 detected by the coordinate detector 48.

For example, if a user inputs instructions of which, for example, a selection for a television broadcast channel a user desires by pressing various operating switches 43 or pressing the touch panel 44; selection for an audio-visual signal provided to the base station from an external AV equipment; and connection to a desired homepage on the Internet, the CPU 45 sends a corresponding message to the wireless LAN card 52 via the PCI bus 53.

The wireless LAN card 52 realizes a wireless LAN conforming to the IEEE 802.11 standard between the monitor 3 and the base station 2 during normal operating mode. Each message sent from the CPU 45 is put into the form of packets in accordance with the IEEE 802.11 standard, and an obtained transmission signal S4 is sent to the base station 2 via a power amplifier 55 and built-in antenna 56 sequentially.

The wireless LAN card 52 receives a transmission signal S4 transmitted via the wireless LAN from the base station 2 via the built-in antenna 56 and the low-noise amplifier 57 sequentially, sends messages obtained from the base station 2 to the CPU 45 via the PCI bus 53, and sends encoded audio-visual data and image data to the signal processing section 49 via the PCI bus 53.

The signal processing section 49 subjects supplied encoded audio-visual data and image data to predetermined signal processing such as decode processing etc., displays pictures and images at the liquid crystal panel 41 based on the obtained picture and image data, and outputs audio from the speaker 42 based on audio data obtained at this time.

At the monitor 3, pictures are displayed based on audio-visual data etc. sent from the base station 2 and audio is output.

(2) Power Supply Control of the Base Station 2

Next, a description is given of the power supply control function of a base station 2 mounted on the wireless television system 1.

The wireless television system 1 is mounted with a power supply control function for the base station 2, for causing the main power supply of the base station 2 to go on and off in conjunction with the power supply of the monitor 3 being made to go on and off and causing the main power supply of the base station 2 to go off if a wireless connection between the base station 2 and the monitor 3 is cut.

Figure 4:
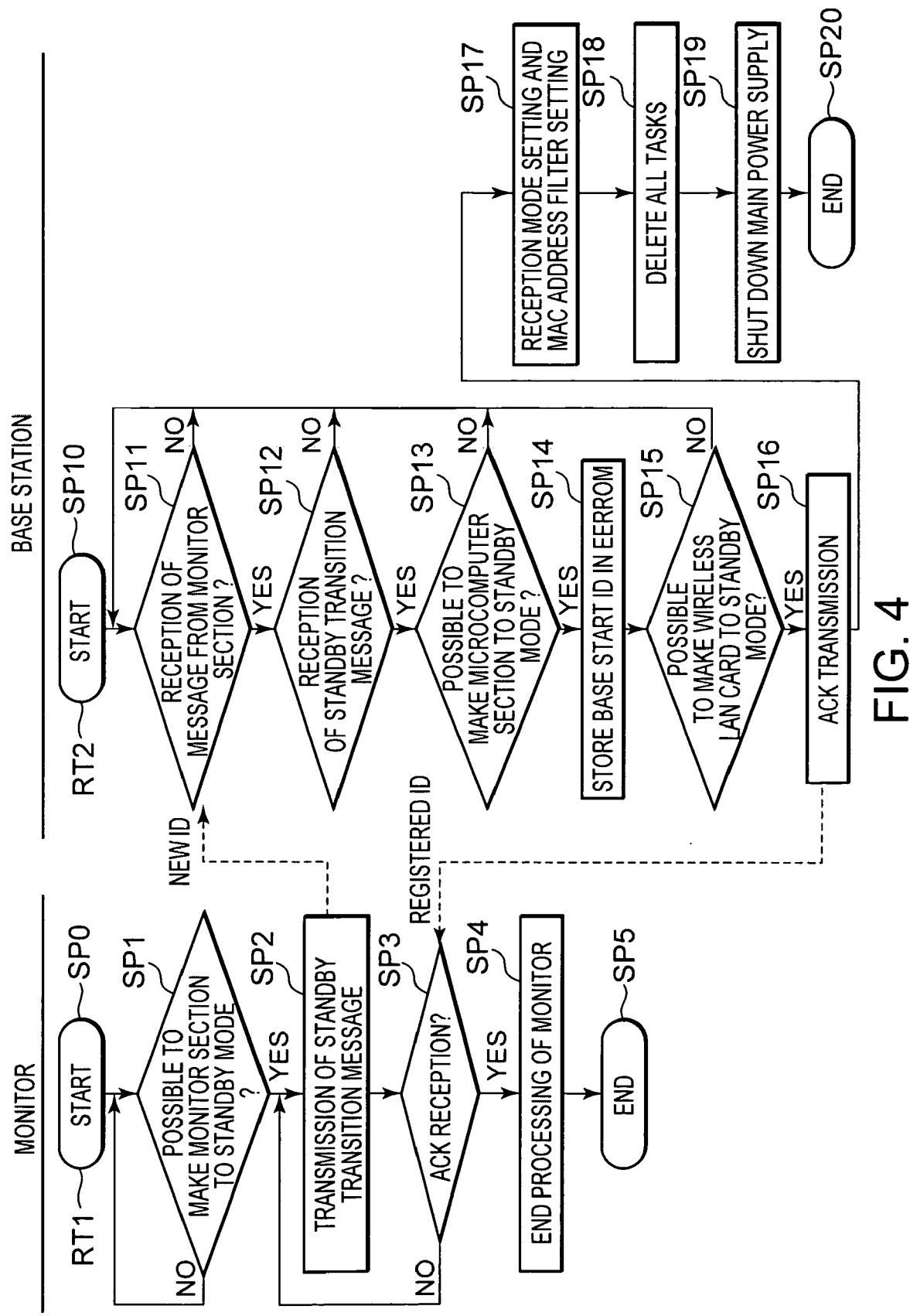
FIG. 4 is a flow chart explaining about shutdown processing of a monitor section and a base station section.

In practice, in the case of the wireless television system 1, if the power supply switch 43A (FIG. 3) of the monitor 3 is turned off, the CPU 45 (FIG. 3) of the monitor 3 turns off the power supply of the monitor 3 in accordance with a monitor shutdown processing procedure RT1 shown in FIG. 4, and the main CPU 20 (FIG. 2) of the base station 2 turns off the main power supply of the base station 2 in accordance with a base shutdown processing procedure RT2 shown in FIG. 4 in conjunction with the above-mentioned power-off of the monitor 3.

Namely, if the power supply switch 43A is turned off at the time of normal operating mode, the CPU 45 of the monitor 3 starts a monitor shutdown processing procedure RT1 in step SP0, proceeds to step SP1, and determines whether or not it is possible for the monitor 3 to immediately go to standby mode.

In the event that, for example, it is not possible to go to standby mode immediately due to a reason such as some kind of application processing currently being carried out, the CPU 45 waits until the reason is resolved. Further, if this reason is resolved, the CPU 45 proceeds to step SP2, and a message (in the following, this is referred to as a standby transition message) indicating for the monitor 3 to go to standby mode is sent to the base station 2 via the wireless LAN card 52.

The CPU 45 then proceeds to step SP3, a message from the base station 2 in response to this standby transition message is awaited, and in the event that a message in response is not received even if a predetermined period of time elapses, step SP2 is returned to, a standby transition message is again sent to the base station 2, and the same processing is repeated thereafter If a message in response is received from the base station 2, the CPU 45 stores an ID (hereinafter referred to as a base activation ID) appended (stored in a data section of a packet) to this response message in flash ROM 46 (FIG. 3), proceeds to step SP4, and executes predetermined completion processing. If the completion processing ends and the monitor 3 goes to standby mode, the CPU 45 proceeds to step SP5 and this monitor shut-down processing procedure RT1 is complete.

At this time, the main CPU 20 (FIG. 2) of the base station 2 starts a base shutdown processing procedure RT2 (FIG. 4) at the same time as putting the operating mode into normal operating mode in step SP10, and then awaits sending of a message from the monitor 3 in step SP11.

If a message from the monitor 3 is received, the main CPU 20 proceeds to step SP12, and it is determined whether or not this message is a standby transition message. If this is not the case, in step SP12, the main CPU 20 returns to step SP11. If this is the case, step SP13 is proceeded to, and a determination is made as to whether or not the microcomputer section 36 (FIG. 2) of the low current block 18 (FIG. 2) can currently be made to go to standby mode.

In the event that the result in step SP13 is negative due to a reason such as the microcomputer section 36 carrying out some kind of processing at this time, the main CPU 20 returns to step SP11. If an affirmative result is obtained, step SP14 is proceeded to, a base activation ID described above assigned to the base station 2 pre-stored at the flash ROM 21 (FIG. 2) is read out, and the base activation ID is recorded in an ID table stored in the EEPROM 37 as a result of notifying the microcomputer section 36 of this base activation ID.

The main CPU 20 then proceeds thereafter to step SP15, and determines whether or not the wireless LAN card 16 (FIG. 2) is currently capable of going to standby mode. In the event that a negative result is obtained in step SP15 due to a reason such as, for example, the wireless LAN card 16 currently being in communication with the monitor 3, the CPU 20 returns to step SP11.

In regards to this, if the result in step SP15 is affirmative, the main CPU 20 proceeds to step SP16, and a message in response to the standby transition message received in step SP11 is sent to the monitor 3. During this time, the main CPU 20 appends the base activation ID described above stored in the flash ROM 21 to the message in response.

Next, the main CPU 20 proceeds to step SP17, firmware for standby mode is downloaded to the wireless LAN card 16 from the flash ROM 21, and a MAC (Media Access Control) address for the monitor 3 acquired at the time of communication with the monitor 3 up to this time is recorded in the wireless LAN card 16.

The wireless LAN card 16 then puts communication mode into a receive-only mode in accordance with the standby mode firmware, and operates so as not to accept and discard signals, of received transmission signal S4 conforming to the IEEE 802.11 standard, other than transmission signals S4 from equipment (the monitor 3) of the recorded MAC address.

The main CPU 20 then proceeds thereafter to step SP18 and deletes all tasks set at this time. After this, step SP19 is proceeded to, supply of main power current to the high-current block 17 is stopped by controlling the DC/DC converter 32 (FIG. 2) via the microcomputer section 36 (FIG. 2) of the low-current block 18 and the main power supply is cut.

The main CPU 20 then proceeds to step SP20, and the base shutdown processing procedure RT2 is complete. Therefore, in this state, no signals containing a beacon are emitted from the base station 2 because the base station 2 only receives the transmission signal S4.

Figure 5:
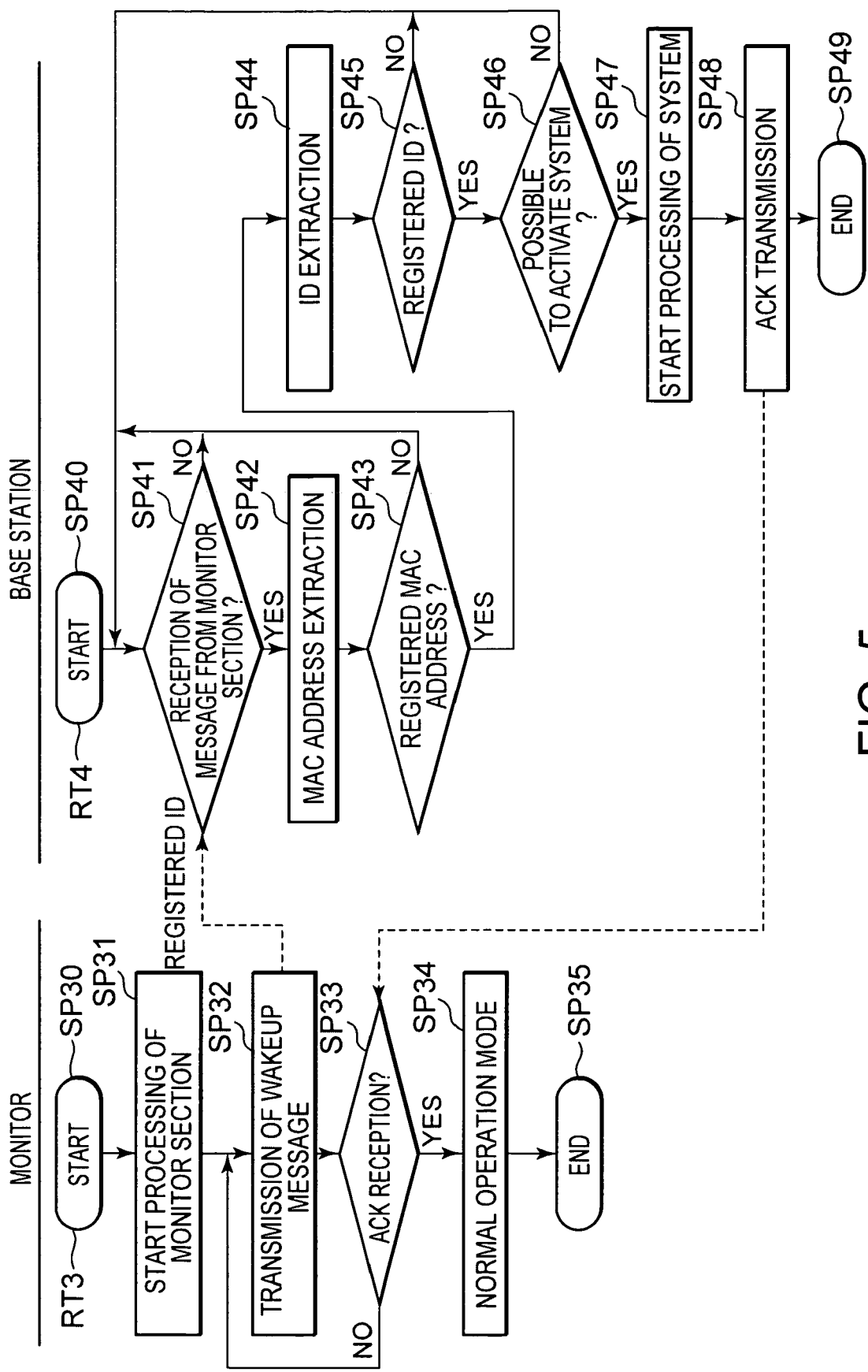
FIG. 5 is a flow chart explaining about start processing of a monitor section and a base station section.

On the other hand, in the case of the wireless television system 1, if the power supply switch 43A is put on, the CPU 45 (FIG. 3) of the monitor 3 puts the power supply of the monitor 3 on in accordance with the monitor activation processing procedure RT3 shown in FIG. 5, while the main CPU 45 (FIG. 2) of the base station 2 puts the main power supply of the base station 2 on in accordance with the base activation processing procedure RT4 shown in FIG. 4 in conjunction with the abovementioned power-on of the monitor 3.

Namely, if the power supply switch 43A is put on at the time of shutdown mode so that the power supply of the monitor 3 is put on, the CPU 45 of the monitor 3 starts the monitor activation processing procedure RT3 in step SP30. Then, in step S31, a control program stored in flash ROM 46 (FIG. 3) is loaded in the SD-RAM 47 (FIG. 3), and predetermined processing is executed in order to start up the monitor 3 in accordance with the control program.

The CPU 45 then proceeds to step SP31, and a wake up message with the base activation ID attached is sent to the base station 2 by sending the base activation ID, which is sent from the base station 2, stored in the flash ROM 46 in step SP3 of the monitor shut down processing procedure RT1 to the wireless LAN card 52 (FIG. 3).

The CPU 45 then proceeds to step SP33, determines whether or not a message in response to this wake up message is received from the base station 2, returns to step SP32 if the result is negative, and repeats the same processing thereafter.

If an affirmative result is obtained in step SP33 as a result of receiving a message in response from the base station 2, the CPU 45 proceeds to step SP34, the operating mode is put into normal operating mode, and after this step SP35 is proceeded to and the monitor activation processing procedure RT3 is complete.

At this time, at the base station 2, standby mode is entered and only the low-current block 18 (FIG. 2) operates. The wireless LAN card 16 (FIG. 2) within the low-current block 18 then awaits sending of a message from the monitor 3 (step SP41).

If a message is provided by the monitor 3, the wireless LAN card 16 extracts a MAC address from this message (step SP42), and determines whether or not the extracted MAC address matches with the MAC address recorded in step SP 17 of the base shut down processing procedure RT2 (FIG. 4) (step SP43).

If the extracted MAC address is determined not to match with the recorded MAC address, this message is discarded, and the wireless LAN card 16 returns to a state of awaiting a message from the monitor 3 (step SP41). In the event that the extracted MAC address is determined to match with the recorded MAC address, an ID (base activation ID) stored in the data section of a packet for the message is extracted (step SP44), and is sent to the microcomputer section 36 (FIG. 2) via the serial bus 38 (FIG. 2).

If the ID is provided by the wireless LAN card 16, the microcomputer section 36 determines whether or not the ID matches with the base activation ID recorded in the ID table stored in EEPROM 37 in step SP3 of the monitor shutdown processing procedure RT1 (FIG. 4) (step SP45). In the event the this result is negative, the ID is discarded, while in the event that the result is affirmative, a determination is made as to whether or not the base station 2 is currently in a state capable of activation (step SP46).

In the event that it is determined that the base station is in a state where activation is not possible for whatever reason, the microcomputer section 36 does not carry out any processing. In the event that it is determined that the base station 2 is in a state where activation is possible, the microcomputer section 36 controls the DC/DC converter 32 (FIG. 2) so as to start supply of main power current to the high-current block 17, and the main power supply of the base station 2 is put on.

The main CPU 20 (FIG. 2) of the high-current block 17 then starts up due to the main power supply going on, the main CPU 20 then reads out the control program stored in the flash ROM 21 (FIG. 2), and loads the program in the SD-RAM 22 (FIG. 2). Predetermined system activation processing for starting up the base station 2 is then executed in accordance with this control program (step SP47). At this time, the main CPU 20 changes over the communication mode of the wireless LAN card 16 from a receive-only mode to a normal mode capable of transmitting and receiving by downloading normal operation mode firmware from the flash ROM 21 to the wireless LAN card 16.

If activation of the base station 2 is then complete, the main CPU 20 sends a message in response to the wake up message received in step SP41 to the monitor 3 (step SP48). As a result, a series of activation processes of the base station 2, which in conjunction with the turning on of the power supply of the monitor 3, is completed (step SP49).

Figure 6:
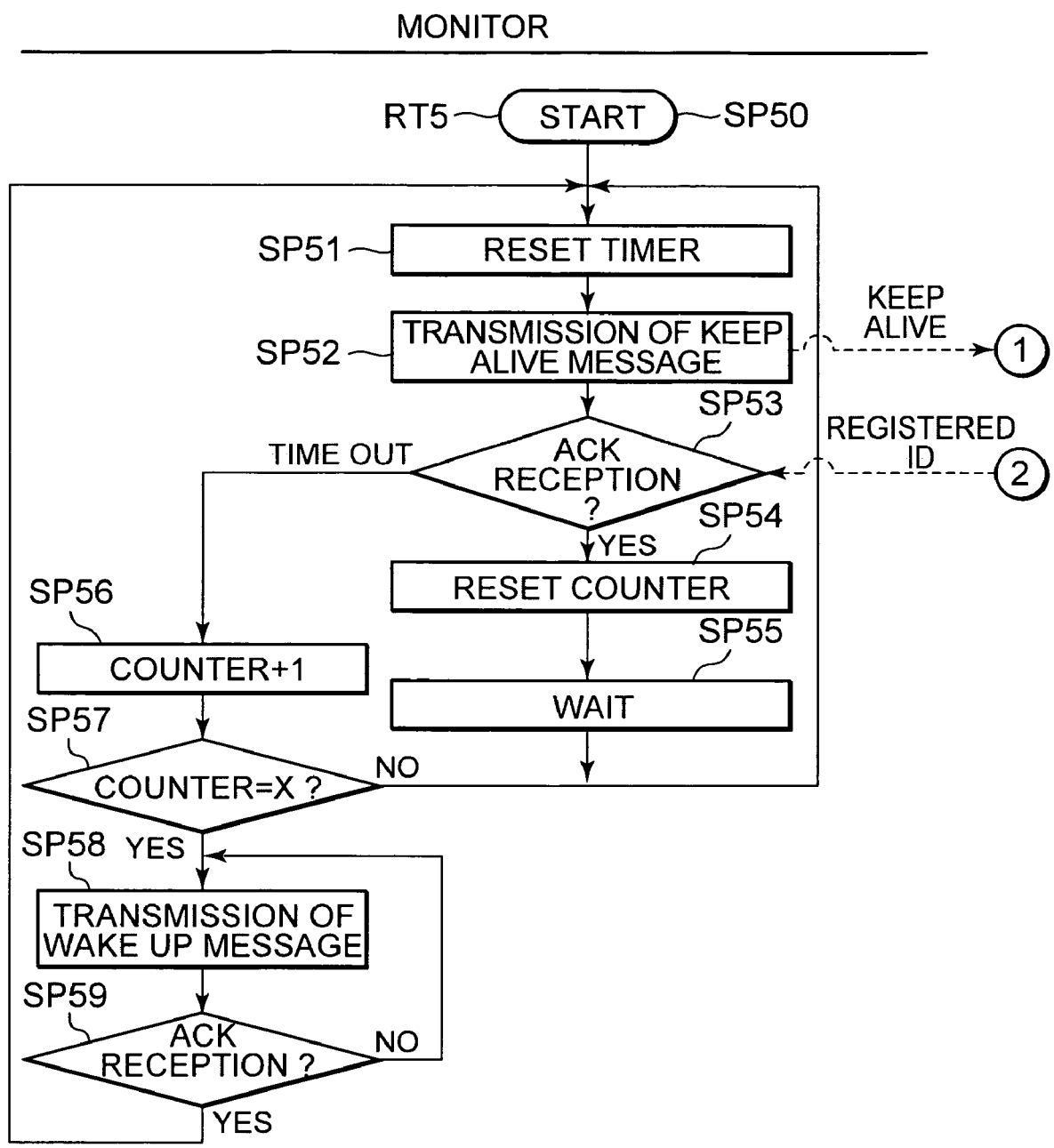
FIG. 6 is a flow chart explaining about communication confirmation processing of a monitor section.
Figure 7:
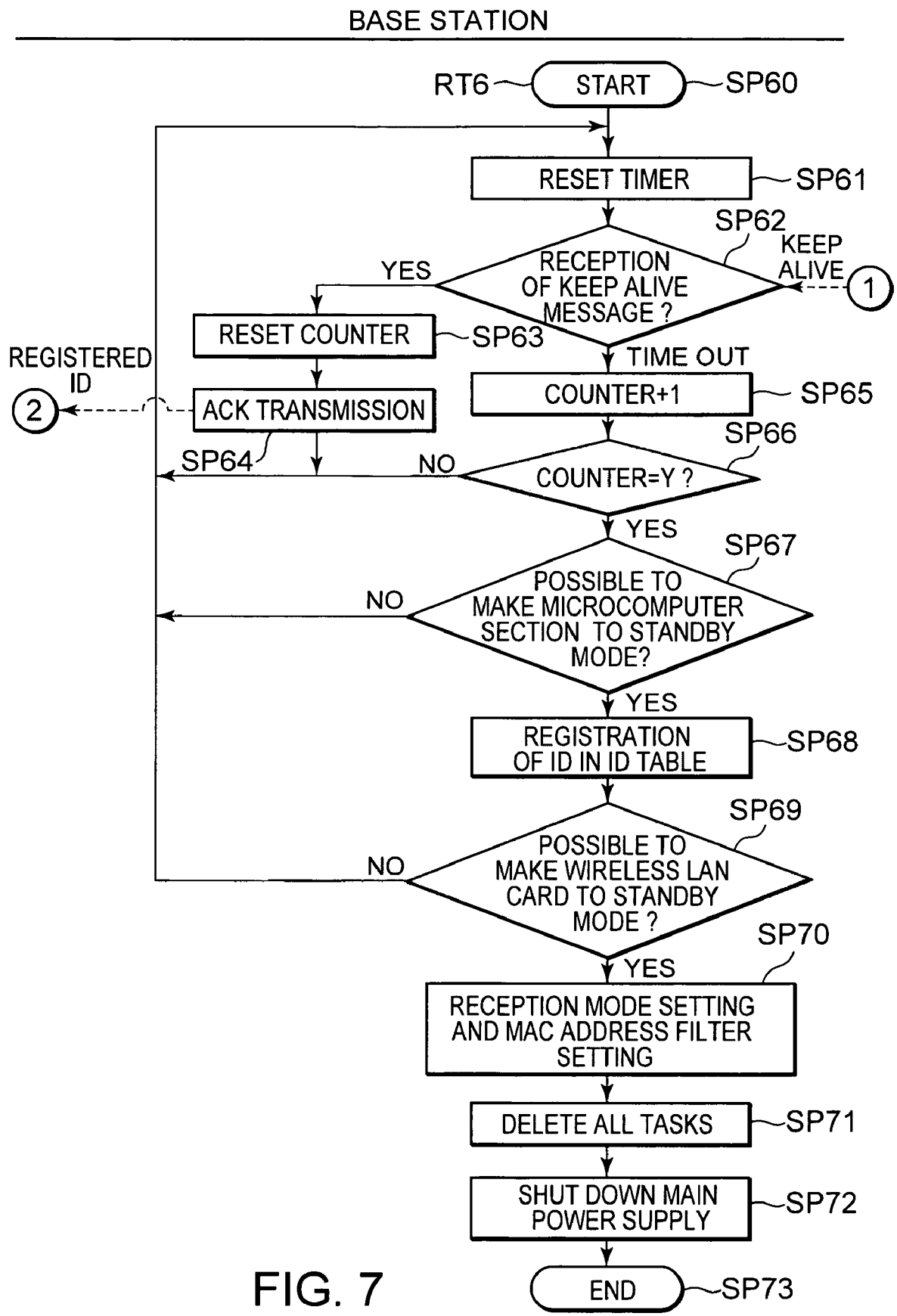
FIG. 7 is a flow chart explaining about communication confirmation processing of a base station section.

On the other hand, in the case of this wireless television system 1, it is possible to make the main power supply of the base station 2 go off under independent control on the side of the base station 2 if communication between the monitor 3 and the base station 2 is cut by executing a communication confirmation processing procedure RT5 shown in FIG. 6 in parallel with the monitor shutdown processing procedure RT1 (FIG. 4) if the CPU 45 (FIG. 3) of the monitor 3 is in normal operating mode and by executing a communication confirmation processing procedure RT6 shown in FIG. 7 in parallel with the base shutdown processing procedure RT2 (FIG. 4) if the main CPU 20 (FIG. 2) of the base station 2 is in normal operating mode.

In practice, if the mode of the CPU 45 of the monitor 3 change to a normal operating mode, the CPU 45 of the monitor 3 starts the communication confirmation processing procedure RT5 shown in FIG. 6 in step SP50. Next, in step SP51, the timer 50 (FIG. 3) is reset and a count is started at the timer 50. Then, in step SP2, a predetermined Keep Alive message is sent to the base station 2.

The CPU 45 then proceeds to step SP53 and determines whether or not a message in response to the Keep Alive message is received from the base station 2 within a predetermined time based on the count value of the timer 50. If the result in step SP53 is affirmative, the CPU 45 proceeds to step SP54, the counter 51 (FIG. 3) is reset, step SP55 is proceeded to, and a predetermined fixed period of time is waited for.

The CPU 45 then returns to step SP51, and repeats a loop of step SP51 to SP55 and back to SP51 again until a negative result is obtained in step SP53. Keep Alive messages are therefore issued from the monitor 3 during this time at fixed time periods.

On the other hand, if a negative result is obtained in step SP53, the CPU 45 proceeds to step SP56 and increases the count value of the counter 51 by "1". The CPU 45 then proceeds to step SP57 and determines whether or not the count value of the counter 51 matches with a default value X set in advance. If a negative result is obtained in step SP57, the CPU 45 returns to step SP51, and the same processing is repeated until the count value of the counter 51 matches with the default value X.

If an affirmative result is obtained in step SP57 due to a message in response not being received from the base station 2 in a certain time period, the CPU 45 proceeds to step SP58. A wake up message with the aforementioned base activation ID attached is then sent to the base station 2. Step SP59 is then proceeded to, and a determination is made as to whether or not a message in response to the wake up message is received from the base station 2 within a predetermined period of time. If a negative result is obtained in step SP59, the CPU 45 returns to step SP58, and the same processing is then repeated.

If an affirmative result is obtained in step SP59 as a result of receiving a message from the base station 2 in response to a wake up message, the CPU 45 returns to step SP51, and the processing of step SP51 to step SP59 is similarly repeated.

At this time, the main CPU 20 (FIG. 2) of the base station 2 starts the communication confirmation processing procedure RT6 shown in FIG. 7 after going to normal operation mode. Next, in step SP61, after resetting the timer 28 (FIG. 2), a count is started at the timer 28. Then, in step SP62, a determination is made as to whether or not a Keep Alive message is received within a predetermined period of time based on the count value of the timer 28.

If a affirmative result is obtained in step SP62, the main CPU 20 proceeds to step SP63 and resets the counter 29 (FIG. 2). Step SP 64 is then proceeded to, and a message in response to a Keep Alive message is sent to the monitor 3.

The main CPU 20 then returns to step SP61 and a loop of step SP61 to SP 64 and back to SP61 is repeated until a negative result is obtained in step SP62. A wireless connection therefore exists during this time between the base station 2 and the monitor 3.

On the other hand, if a negative result is obtained in step SP62, the CPU 20 proceeds to step SP65 and increases the count value of the counter 29 by "1". The CPU 45 then proceeds to step SP66 and determines whether or not the count value of the counter 29 matches with a default value Y set in advance. If a negative result is obtained in step SP66, the CPU 20 returns to step SP61, and the same processing is repeated until the count value of the counter 29 matches with the default value Y.

In the event that an affirmative result is obtained in step SP66 due to not receiving a Keep Alive message from the monitor 3 within a certain time, the main CPU 20 proceeds to step SP67 and determines whether or not the microcomputer section 36 (FIG. 2) of the low-current block 18 (FIG. 2) is currently in a state capable of a transition to a standby mode.

If a negative result is obtained in step SP67 due to the microcomputer section 36 carrying out some kind of processing etc. at this time, the main CPU 20 returns to step SP61. If an affirmative result is obtained in step SP67, step SP 68 is proceeded to, the base activation ID stored in the flash ROM 21 (FIG. 2) is read out, the microcomputer section 36 is notified of this base activation ID, and the base activation ID is recorded in an ID table stored in the EEPROM 37.

The main CPU 20 then proceeds thereafter to step SP69, and determines whether or not the wireless LAN card 16 (FIG. 2) is currently capable of going to standby mode. In the event that a negative result is obtained in step SP69 due to a reason such as, for example, the wireless LAN card 16 currently being in communication with the monitor 3, the main CPU 20 returns to step SP61.

If an affirmative result is obtained in step SP69, the main CPU 20 proceeds to step SP70. After then carrying out processing in step SP70 to step SP72 that is in the same way as the processing of step SP17 to step SP19 of the base shutdown processing procedure RT2 described above in FIG. 4, step SP73 is proceeded to and the communication confirmation processing procedure RT6 is complete.

It is therefore possible for the main power supply of the base station 2 to be made to go off in this wireless television system 1 both in cases where the monitor 3 is conveyed to a position away from the base station 2 exceeding the communication range and in cases where the communication between the monitor 3 and the base station 2 is damaged.

(3) Operation and Results of this Embodiment

In the above configuration, on the side of the monitor 3, if the power supply switch 43A is turned off, as a result, a standby transition message is sent to the base station 2. If this standby transition message is then received on the side of the base station 2, firmware of the wireless LAN card 16 is overwritten with standby mode firmware for read only, and the main power supply is made to go off. At the base station 2, a sub-power supply is supplied to a low-current block 18 even after the main power supply is turned off, and a Wake Up message from the monitor 3 is awaited.

On the side of the monitor 3, a Wake Up message is sent to the base station 2 in response to the power supply switch 43A going on and if this Wake Up message is received on the side of the base station 2, the main power supply is put on under the control of the microcomputer section 36 of the low-current block 18. The firmware of the wireless LAN card 16 is then overwritten by the main CPU 20 with firmware for use in normal operation mode capable of enabling information to be sent to and from the monitor 3.

In this wireless television system 1, it is possible to make the main power supply of the base station 2 go on and off in conjunction with the power supply of the monitor 3 going on and off. This releases the user from the inconvenience of having to independently operate the power supplies of the monitor 3 and the base station 2 such as, for example, if manually individually turning off the power supplies of the monitor 3 and the base station 2 after watching a television broadcast program.

In this case, at the wireless television system 1, if the main power supply of the base station 2 is put off, the wireless LAN card 16 of the base station 2 is set to a receive-only mode. This means that beacons are not emitted from the base station 2 during this time, and it is possible to prevent information etc, which is SSID of the base station 2 or information relating to encryption at the time of communication with the monitor 3 from being misappropriated by a third party.

According to this configuration, a standby transition message or a Wake Up message is sent to the base station 2 in response to an off operation or on operation of the power supply of the monitor 3. On the side of the base station 2, the main power supply is put off or on in response to the message if a standby transition message or wake up message is received, a sub-power supply is supplied to the low-current block 18 even after the main power supply goes off, and firmware of the wireless LAN card 16 is overwritten with firmware for a standby receive-only mode or firmware for a normal operation mode where transmission or receipt is possible during a period where the main power supply is on or off. As a result, the main power supply of the base station 2 is made to go on and off in conjunction with the power supply of the monitor 3 going on and off, it is possible to prevent information relating to encryption occurring during communication between an SSID of the base station 2 and the monitor 3 etc. from being misappropriated by a third party. It is therefore possible to enable implementation of a wireless television system that dramatically improves convenience for a user while maintaining a highly secure environment.

(4) Further Embodiments

In the above embodiments, a description is given of application of the present invention to a wireless television system 1 but the present invention is not limited in this respect and may also be broadly applied to various other communication systems and communication apparatuses carrying out communication in accordance with predetermined wireless communications standards between the first and the second communication apparatuses.

Further, in the above embodiments, a description is given of the case where a base activation ID is stored in a flash ROM 21 of the base station 2 in advance, but the present invention is not limited in this respect, and the main CPU 20 of the base station 2 may also generate a random number etc. each time and use this as a base activation ID.

Moreover, in the embodiments described above, a description is given of the case where firmware of the wireless LAN card 16 of the base station 2 is overwritten in conjunction with the main power supply going on and off but the present invention is not limited in this respect. For example, firmware for use in standby mode and for use in normal operation mode may be stored in advance in the wireless LAN card 16 so that the wireless LAN card 16 is then controlled by the CPU 20 in such a manner as to switch of setting as to which firmware is to be used as the firmware in conjunction with the main power supply going on and off.

In the above embodiments, a description is given where message transmission means for transmitting a standby transition message or a Wake Up message to a base station 2 in conjunction with an off operation or on operation of the power supply switch 43A at the monitor 3 is configured from the CPU 45 performing overall control of the monitor 3 and the wireless LAN card 52 but the present invention is not limited in this respect and, for example, some kind of means having this kind of function may be provided separately from the CPU 45.

In the embodiments described above, a description is given of the case where the wireless LAN card 16 taken as the communication means of the base station 2 communicates with the monitor 3 using a communication format conforming to the IEEE 802.11 standard but the present invention is not limited in this respect and various wireless communication standards taken as wireless communication standards applicable to communication between the monitor 3 and the base station 2 may also be broadly applied to the embodiments of the present invention.

Further, in the above embodiments, a description is given of the case where EEPROM 37 is applied as means for storing a base activation ID at the low-current block 18 but the present invention is not limited in this respect and a memory other than EEPROM or a disc-like shape storage media etc. such as, for example, hard discs etc. other than memory may be broadly applied to the embodiments of the present invention.

As with the above, in the aforementioned embodiments, a description is given of the case of the application of the flash ROM 21 as means for storing standby mode firmware and normal operating mode firmware that are downloaded to the wireless LAN 16, and base activation ID at the high-current block 17 but the present invention is not limited in this respect and a memory other than flash ROM or a disc-like shape storage media etc. such as, for example, hard discs etc. other than memory may be broadly applied to the embodiments of the present invention.

In the embodiment described above, a description is given where both function as the first power supply control means for causing the main power supply of the base station 2 to go off if a standby transition message is received at the base station 2 and as the mode setting means for setting a receive-only mode at the wireless LAN card 16 if a standby transition message is received are loaded on the main CPU 20 for performing overall control of the base station 2 but the present invention is not limited in this respect, and means having the functions may also be provided separately from the main CPU 20.

Similarly, in the embodiments described above, a description is given where both functions as the second power supply control means for putting the main power supply of the base station 2 on if a wake up message is received at the base station 2 and as the mode setting means for setting a normal mode for transmitting and receiving at the wireless LAN card 16 if a Wake Up message is received are loaded on the microcomputer section 36 in the low-current block 18 but the present invention is not limited in this respect, and these functions may also be loaded separately into individual means.

Further, in the above embodiments, a description is given of the case of applying a DC/DC converter 32 as sub-power supply providing means for providing a sub-power supply to the low-current block 18 but the present invention is not limited in this respect and other power supply providing means may also be broadly be applied to the embodiments of the presento invention depending on the power supply providing configuration.

The present invention may be broadly applied to various communication systems and communication apparatuses in addition to wireless television systems.

What is claimed is:

1. A communication system communicating between a first communication terminal and a second communication terminal in accordance with a predetermined wireless communication standard, wherein the first communication terminal comprises:
a switch switching on or off a power supply of the first communication terminal; and
message transmission means for transmitting a predetermined first message or second message to the second communication terminal corresponding to an on/off operation of the switch, the second communication terminal comprises:
communication means for communicating with the first communication terminal in accordance with the predetermined wireless communication standard;
first power supply control means switching off a main power supply of the second communication terminal at reception of the first message;
second power supply control means for switching on the main power supply of the second communication terminal at reception of the second message;
mode setting means for setting the communication means in a receive only mode at reception of the first message, or setting the communication means in a mode capable of transmitting and receiving at reception of the second message; and sub-power supply providing means for providing a sub power supply as a driving power supply to the second power supply control means during a period where the main power supply of the second communication terminal is off.

2. The communication system according to claim 1, wherein the second communication terminal further comprises external network connection means capable of connecting to an external network, during a period where the main power supply of the second comminication terminal is on.

3. The comminication system according to claim 1, wherein the first power supply control means of the second communication terminal transmits predetermined identification information to the first communication terminal via the communication means, and notifies the predetermined identification information to the second power supply control means, the message transmission means of the first communication terminal stores the identification information transmitted from the second communication terminal, adds the identification information to the second message, and transmits the second message to the second communication terminal, and the second power supply control means of the second communication terminal stores the identification information notified from the first power supply control means and switches on the main power supply of the second communication terminal if the identification information added to the second message and the stored identification information match.

4. The communication system according to claim 1, wherein the message transmission means transmits a predetermined third message to the second communication terminal at an interval of a first predetermined time period, and the first power supply control means of the second communication terminal switches off the main power supply of the second communication terminal if the third message is not received within a second predetermined time period that is longer than the first predetermined time period.

5. A communication apparatus for communicating with another communication terminal in accordance with a predetermined wireless communication standard, the communication apparatus comprising:

communication means communicating with the another communication terminal in accordance with the predetermined wireless communication standard;

first power supply control means for switching off a main power supply of the communication apparatus at reception of a first message transmitted from the another communication terminal in response to an operation of switching off a power supply of the another communication terminal;

second power supply control means for switching on the main power supply of the communication apparatus at reception of a second message transmitted from the another communication terminal in response to an operation of switching on the power supply of the another communication terminal;

mode setting means for setting the communication means in a receive only mode at reception of the first message and setting the communication means in a mode capable of transmitting and receiving at reception of the second message; and sub-power supply providing means for providing a sub power supply as an driving power supply to the second power supply control means during a period where the main power supply of the communication apparatus is off.

6. The communication apparatus according to claim 5, further comprising, external network connection means capable of connecting with an external network if the main power supply of the communication apparatus is on.

7. The communication apparatus according to claim 5, wherein the first power supply control means transmits predetermined identification information via the communication means and notifies the identification information to the second power supply control means, the another communication terminal adds the identification information to the second message and transmits the second message added with the identification information, and the second power supply control means stores the identification information notified from the first power supply control means, and switches on the main power supply of the communication apparatus if the identification information added to the second message and the stored identification information match.

8. The communication apparatus according to claim 5, wherein the first communication terminal transmits a predetermined third message to the second communication terminal at an interval of a first predetermined time period, and the first power supply control means switches off the main power supply of the communication apparatus if the third message is not received within a second predetermine time period that is longer than the first predetermined time period.

9. A control method for controlling a communication apparatus that communicates with another communication terminal in accordance with a predetermined wireless communication standard, the control method comprising:

a first step of communicating with the another communication terminal in accordance with the predetermined wireless communication standard; and a second step of switching off a main power supply of the communication apparatus by a first power supply control means if a first message transmitted from the another communication terminal in response to an operation of switching off the another communication terminal is received, and of switching on the main power supply of the communication apparatus by a second power supply control means if a second message transmitted from the another communication terminal in response to an operation of switching on the another communication terminal is received, wherein the communication apparatus supplies a sub power supply as a driving power supply to the second power supply control means during power-off of the main power supply of the communication apparatus, in the second step, the communication apparatus sets a communication mode between the communication apparatus and the another communication terminal in a receive only mode at reception of the first message, or sets the communication mode in a mode capable of transmitting and receiving at reception of the second message.

10. The control method for controlling a communication apparatus according to claim 9, wherein the communication apparatus comprises external network connection means capable of connecting with an external network if the main power supply of the communication apparatus is on.

11. The control method for controlling a communication apparatus according to claim 9, wherein in the first step, the first power supply control means transmits predetermined identification information to the another communication terminal, and notifies the predetermined identification information to the second power supply control means, and the second power supply control means stores the identification information notified from the first power supply control means, in the second step, the second power supply control means switches on the main power supply of the communication apparatus if the identification information added to the second message and the stored identification information match.

12. The control method for controlling a communication apparatus according to claim 9, wherein in the second step, the second power supply control means switches off the main power supply of the communication apparatus if the third message, which is transmitted from the another communication terminal at an interval of a first predetermined time period, is not received within a second predetermined time period that is longer than the first predetermined time period.

* * * * *